Jan. 2, 1951     A. E. RHEINECK     2,536,658
PROCESS FOR PREPARING NITROCELLULOSE COMPATIBLE RESINS
FROM PENTAERYTHRITOL, AN ALPHA-BETA UNSATURATED
DICARBOXYLIC ACID AND A ROSIN ACID
Filed March 25, 1947
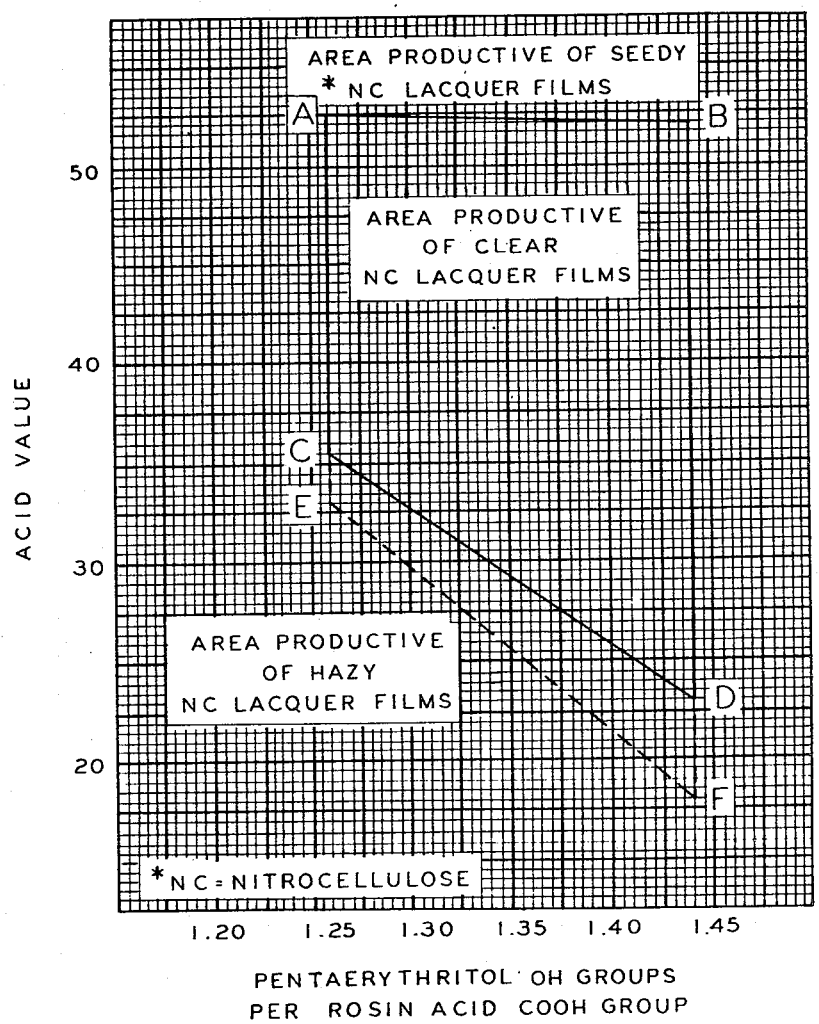
FIG. I
ALFRED E. RHEINECK
*INVENTOR.*
BY Ernest G. Peterson
AGENT Patented Jan. 2, 1951

2,536,658

UNITED STATES PATENT OFFICE 2,536,658

PROCESS FOR PREPARING NITROCELLULOSE COMPATIBLE RESINS FROM PENTAERYTHRITOL, AN ALPHA-BETA UNSATURATED DICARBOXYLIC ACID AND A ROSIN ACID

Alfred E. Rheineck, Wilmington, Del., assignor to Hercules Powder Company, Wilmington, Del., a corporation of Delaware Application March 25, 1947, Serial No. 736,913

19 Claims. (Cl. 260—26)

1

This invention relates to hard resins derived from a pentaerythritol, an alpha-beta unsaturated dicarboxylic acid and a rosin acid and to methods for the preparation thereof.

It is known to produce esters of a pentaerythritol, an alpha-beta unsaturated dicarboxylic acid and a rosin acid. Such esters are characterized by great hardness, high melting point, good heat stability and solubility in drying oils, see U. S. 2,322,197 to F. G. Oswald and U. S. 2,344,194 to G. R. Anderson. In some respects these esters constitute an improvement over esters derived from glycerol, an alpha-beta unsaturated dicarboxylic acid and a rosin acid. It is also known to use such esters in the preparation of oleoresinous varnishes and in lacquers. However, despite the fact that the pentaerythritol esters contribute desirable properties to such compositions, it is well known that the resins derived from pentaerythritol have an objectionable characteristic when used in nitrocellulose lacquers. The coatings or films resulting from such compositions evidence an incompatibility of the ingredients which is variously described as seediness, graininess or haziness. In this respect the commercial resins known as Pentalyn G and Pentalyn X are incompatible with nitrocellulose.

Seediness or graininess can be observed by viewing in the direction of a source of light a dried film held horizontally at near eye level. The phenomenon is manifested as small specks spread uniformly throughout the film. Haziness may be observed by viewing the film against a dark background and is manifested as a smoky or milky condition.

In my application S. N. 718,458, filed December 26, 1946, there are described hard resinous esters prepared from a pentaerythritol, an alpha-beta unsaturated dicarboxylic acid and a rosin acid material which are truly compatible with nitrocellulose and which may be used in nitrocellulose lacquer formulations to provide perfectly clear lacquer films. According to that disclosure, it has been found that such esters can be prepared by observing certain critical factors relating to the type and proportions of ingredients and to the acid value of the final ester. Thus, it is required that there be employed in the esterification an excess of pentaerythritol over and above that theoretically required to completely esterify the dicarboxylic acid and the rosin acid material. More specifically, the pentaerythritol is employed in an amount sufficient to provide the amount required stoichiometrically to completely esterify the dicarboxylic acid and to provide in addition

2 from 1.26 to 1.44 pentaerythritol hydroxyl groups for each rosin acid carboxyl group. It is further required that the unsaturated dicarboxylic acid be employed in the amount of from 0.136 to 0.272 mol per mol of rosin acid.

Further, in accordance with said application, to obtain the desired nitrocellulose compatible esters, the esterification reaction is stopped at a point such that the acid value of the finished ester is within the range which is productive of nitrocellulose compatibility. This acid value range is variable and is a function of both the proportion of alpha-beta unsaturated dicarboxylic acid to rosin acid and the pentaerythritol hydroxyl excess as defined in the paragraph immediately preceding. This can be seen more clearly from an inspection of Figure 1. Area ABCD of Figure 1 is a graphic representation of the acid value compatibility ranges which obtain when the molar ratio of dicarboxylic acid to rosin acid is held constant (about 0.238) and the pentaerythritol hydroxyl excess, as defined in the paragraph immediately preceding, varied. Thus, at 1.26 pentaerythritol hydroxyls per rosin acid carboxyl group the acid value range productive of nitrocellulose compatibility is from about 35.5 to about 52.5, whereas at 1.44 pentaerythritol hydroxyls per rosin acid carboxyl group, the acid value range productive of nitrocellulose compatibility is from about 23.0 to about 52.0. The position of the line CD of area ABCD changes somewhat with variation in the proportion of dicarboxylic acid to rosin acid, it being generally somewhat lower as the proportion of dicarboxylic acid to rosin acid is increased and somewhat higher as the proportion is decreased. The slope of the line CD, however, remains substantially constant. Also, the line AB changes position somewhat as the proportion of dicarboxylic acid to rosin acid is varied.

From the above, it will be seen that, assuming the molar ratio of dicarboxylic acid to rosin acid remains fixed, for any particular hydroxyl excess there exists a definite range of acid values wherein truly nitrocellulose compatible resins are obtained. The range may be referred to as the acid value compatibility range. Furthermore, the area which defines the acid value ranges which obtain for a series of hydroxyl excesses may be regarded as the acid value compatibility band, see area ABCD of Figure 1.

It has now been found that certain substances, when present with the reactants during the resin-forming reaction, have the effect of extending the acid value compatibility range or broadening the acid value compatibility band, as the case may be. These substances are referred to herein as compatibility catalysts. More specifically, it has been found that the substances which are effective in this manner are compounds of metals of groups IA, IIA and IIB of the periodic table. Only those compounds of metals having atomic weights below 140 appear to be effective. However, outside the aforementioned groups lead and cobalt compounds appear to be effective catalysts. To be effective, the compounds employed must be of such a nature that aqueous solutions thereof are basic or alkaline. For example, calcium acetate is an effective compatibility catalyst, in accordance with this invention. Referring to Figure 1, when 1.44 pentaerythritol hydroxyl groups per rosin acid carboxyl group are employed, the use of calcium acetate as catalyst changes the acid value compatibility range from 52–23 to 52–18. This constitutes a substantial improvement both in that the range of compatibility is much broader and hence easier to hit in commercial production and in that nitrocellulose resins can be obtained at lower acid values.

Although the compatibility catalysts broadly defined above all have the effect of broadening the acid value compatibility band, they do not all give precisely the same compatibility band. Thus, calcium compounds will not necessarily give precisely the same compatibilty band as will sodium compounds. However, either type of catalyst will provide a broadened compatibility band as compared with the band which obtains in the case of no catalyst.

Furthermore, the amount of catalyst has an effect on the shape of the compatibility band. Taking all these factors into consideration, the lowest acid value at which nitrocellulose compatible resins have been obtained using a compatibility catalyst is 10, whereas the highest acid value at which useful nitrocellulose compatibility resins have been obtained is 65.

Referring again to Figure 1, the area ABCD represents the acid value compatibility band which obtains when a resin-grade pentaerythritol is employed and no catalyst is added, whereas the area ABEF represents the acid value compatibility band which obtains when calcium acetate is added as catalyst, see Examples 1–3, inclusive.

In preparing nitrocellulose compatible esters in accordance with this invention, there is another factor which must be taken into account, and this has to do with the particular type of pentaerythritol employed. Pentaerythritol is made commercially by the condensation of acetaldehyde and formaldehyde. Along with the pentaerythritol monomer formed, there are formed comparatively small amounts of related hydroxylated substances. One of these compounds, dipentaerythritol, is an ether having the following structure:

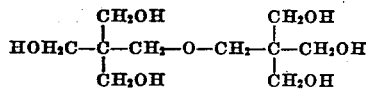

Another related compound, tripentaerythritol, is formed in even smaller amounts. According to the best evidence, it is believed to have the following structural formula:

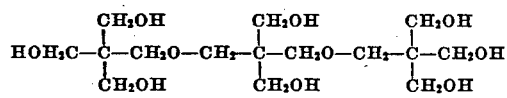

Dipentaerythritol, tripentaerythritol and higher ethers of pentaerythritol may be grouped together under the generic term "polypentaerythritols." This term is employed herein to mean those compounds having higher molecular weights than pentaerythritol monomer which are formed actually or theoretically by etherifying one or more of the hydroxyl groups of pentaerythritol monomer with other pentaerythritol molecules. The monomer, dimer, trimer, etc. of pentaerythritol refer to simple pentaerythritol, dipentaerythritol and tripentaerythritol, respectively.

In accordance with this invention, the pentaerythritol employed in making the desired resins may be pentaerythritol monomer, polypentaerythritols having hydroxyl values of at least 38%, or pentaerythritol monomer-polypentaerythritol mixtures having hydroxyl values of at least 38%. Preferably, the pentaerythritol employed will contain from 70 to 90% pentaerythritol monomer and will have a hydroxyl value of at least 42%. Included within this preferred classification are the so-called technical or resin-grade pentaerythritols available commercially.

To determine the proper proportions of rosin acid material and a particular pentaerythritol to employ, it is desirable to first determine the hydroxyl content of the pentaerythritol by the acetylation method. The combining or equivalent weight of the pentaerythritol, i. e., that amount theoretically needed to completely esterify 1 mol of rosin acid (or ½ mol of dicarboxylic acid), is given by the following formula:

$$\text{Combining weight} = \frac{17 \times 100}{\text{Per cent hydroxyl content of pentaerythritol}}$$

The amount of pentaerythritol theoretically required to completely esterify the dicarboxylic acid employed can be easily computed. The amount of pentaerythritol required to provide the desired number of pentaerythritol hydroxyl groups per rosin acid carboxyl group can be obtained by multiplying the combining weight of the pentaerythritol by the desired number of pentaerythritol hydroxyl groups per rosin acid carboxyl group and then multiplying this product by the number of mols of rosin acid to be employed. The sum of these two amounts of pentaerythritol represents the total amount of pentaerythritol required.

Having now indicated in a general way the nature and purpose of the invention, there follows a more detailed description of specific embodiments of the invention.

*Example 1*

| | Parts |
|---|---|
| N wood rosin | 1006 |
| Pentaerythritol | 202.5 |
| Maleic anhydride | 70.0 |
| Calcium acetate·H₂O | 3.0 |

The wood rosin employed contained about 10% neutral bodies. Hence, the rosin acid content amounted to 906 parts or 3 mols. The pentaerythitol was a technical grade material containing about 83% pentaerythritol monomer and having a hydroxyl content of about 46.0%. The combining weight of the pentaerythritol was 37. The amount of pentaerythritol employed was accordingly sufficient to provide the amount required stoichiometrically to completely esterify the maleic anhydride and to provide in addition 1.35 pentaerythritol hydroxyl groups for each rosin acid carboxyl group. The maleic anhydride employed amounted to 0.238 mol per mol of rosin acid.

The pentaerythritol employed contained a small amount of sodium as an impurity. The sodium was actually present in the pentaerythritol as the formate and the carbonate. However, in determining the amount quantitatively, it was converted to the sulfate, and the sodium sulfate obtained amounted to 0.27%. Hence, there was present in the pentaerythritol 0.0077 equivalent of sodium or 0.0026 equivalent of sodium per mol of rosin acid. The calcium acetate added provided in addition 0.0110 equivalent of calcium per mol of rosin acid.

The rosin was heated with the maleic anhydride to 200° C. at which time the pentaerythritol and calcium acetate were added with vigorous mechanical agitation. The mass was heated to 280° C. and held at that temperature for one hour with continued agitation. Mechanical agitation was then discontinued and a gentle stream of $CO_2$ was passed through the reaction mixture while maintaining a temperature of 280° C. Samples were taken at intervals as esterification progressed. It was found that the ester samples having acid values of from 25 to 52 (determined using phenolphthalein indicator on the esters after they had cooled to room temperature) were compatible with ½ sec. R. S. nitrocellulose at ester to nitrocellulose ratios of from 1.5–1.0 to 4.0–1.0, see area ABEF of Figure 1. Lacquers containing these ingredients in the indicated proportions provided lacquer films which were perfectly clear and evidenced no seediness or haziness. Esters having an acid value above 52 were found to give seedy films with nitrocellulose whereas esters having an acid value below 25 were found to give hazy films with nitrocellulose.

Duplicating the example leaving out the calcium acetate, it was found that nitrocellulose compatible esters were achieved only in the acid value range of 29–52. Removal of the sodium from the pentaerythritol prior to esterification did not affect this compatibility range.

Example 2

| | Parts |
|---|---|
| N wood rosin | 1006 |
| Maleic anhydride | 70.0 |
| Pentaerythritol | 212.5 |
| Calcium acetate·H₂O | 3.0 |

The same types of rosin and pentaerythritol were employed as in Example 1. The same proportion of maleic anhydride to rosin acid was employed. The amount of pentaerythritol employed, however, was sufficient to provide the amount required stoichiometrically to completely esterify the maleic anhydride and to provide in addition 1.44 pentaerythritol hydroxyl groups for each rosin acid carboxyl group.

There was present in the pentaerythritol 0.0081 equivalent of sodium or 0.0027 equivalent of sodium per mol of rosin acid. The calcium acetate added provided in addition 0.0110 equivalent of calcium per mol of rosin acid.

The method employed in esterifying the ingredients was substantially identical with that of Example 1. It was found that ester samples having acid values of from 18 to 52 (determined using phenolphthalein indicator on the esters after they had cooled to room temperature) were compatible with ½ sec. R. S. nitrocellulose at ester to nitrocellulose ratios of from 1.5–1.0 to 4.0–1.0, see area ABEF of Figure 1. Lacquers containing these ingredients in the indicated proportions provided lacquer films which were perfectly clear and evidenced no seediness or haziness. Esters having an acid value above 52 were found to give seedy films with nitrocellulose whereas esters having an acid value below 18 were found to give hazy films with nitrocellulose. Duplicating the example leaving out the calcium acetate, it was found that nitrocellulose compatible resins were achieved only in the acid value range of 23–52.

Example 3

| | Parts |
|---|---|
| N wood rosin | 1006 |
| Maleic anhydride | 70 |
| Pentaerythritol | 193 |
| Calcium acetate·H₂O | 3.0 |

The same types of rosin and pentaerythritol were employed as in Example 1. The same proportion of maleic anhydride to rosin acid was employed. The amount of pentaerythritol employed, however, was sufficient to provide the amount required stoichiometrically to completely esterify the maleic anhydride and to provide in addition 1.26 pentaerythritol hydroxyl groups for each rosin acid carboxyl group.

There was present in the pentaerythritol 0.0073 equivalent of sodium or 0.0024 equivalent of sodium per mol of rosin acid. The calcium acetate added provided in addition 0.0110 equivalent of calcium per mol of rosin acid.

Substantially the same esterification conditions obtained as in Example 1. It was found that ester samples having acid values of from 33.5 to 52.5 were compatible with ½ sec. R. S. nitrocellulose at ester to nitrocellulose ratios of from 1.5–1.0 to 4.0–1.0, see area ABEF of Figure 1. Esters having an acid value above 52.5 were found to give seedy films with nitrocellulose whereas esters having an acid value below 33.5 were found to give hazy films with nitrocellulose. Duplicating the example leaving out the calcium acetate, it was found that nitrocellulose compatible resins were achieved only in the acid value range of 35.5 to 52.5.

Example 4

| | Parts |
|---|---|
| N wood rosin | 1006 |
| Maleic anhydride | 70 |
| Pentaerythritol | 212.5 |
| Zinc oxide | 3.0 |

The same types of rosin and pentaerythritol were employed as in Example 1. The same proportion of maleic anhydride to rosin acid was employed. The amount of pentaerythritol employed was sufficient to provide the amount required stoichiometrically to completely esterify the maleic anhydride and to provide in addition 1.44 pentaerythritol hydroxyl groups per each rosin acid carboxyl group.

There was present in the pentaerythritol 0.0081 equivalent of sodium or 0.0027 equivalent of sodium per mol of rosin acid. The zinc oxide added provided in addition 0.0246 equivalent of zinc per mol of rosin acid.

Substantially the same esterification conditions obtained as in Example 1. It was found that ester samples having acid values of from 25 to 64 were compatible with ½ sec. R. S. nitrocellulose at ester to nitrocellulose ratios of from 1.5–1.0 to 4.0–1.0. Esters having an acid value above 64 were found to give seedy films with nitrocellulose whereas esters having an acid value below 25 were found to give hazy films with nitrocellulose.

Example 5

| | Parts |
|---|---|
| N wood rosin | 1006 |
| Pentaerythritol | 202.5 |
| Citraconic anhydride | 77.0 |
| Calcium acetate·H₂O | 3.0 |

The same types of rosin and pentaerythritol were employed as in Example 1. The amount of pentaerythritol employed was accordingly sufficient to provide the amount required stoichiometrically to completely esterify the citraconic anhydride and to provide in addition 1.35 pentaerythritol hydroxyl groups for each rosin acid carboxyl group. The citraconic anhydride amounted to 0.229 mol per mol of rosin acid.

There was present in the pentaerythritol .0077 equivalent of sodium or .0026 equivalent of sodium per mol of rosin acid. The calcium acetate added provided in addition 0.0110 equivalent of calcium per mol of rosin acid.

The method employed in esterifying the ingredients was substantially identical with that of Example 1. It was found that ester samples having acid values of from 14 to 40 were entirely compatible with ½ sec. R. S. nitrocellulose at ester to nitrocellulose ratios of from 1.5–1.0 to 4.0–1.0.

Example 6

| | Parts |
|---|---|
| N wood rosin | 1006 |
| Fumaric acid | 83.0 |
| Pentaerythritol | 202.5 |
| Calcium acetate·H₂O | 3.0 |

The same types of rosin and pentaerythritol were employed as in Example 1. The amount of pentaerythritol employed was accordingly sufficient to provide the amount required stoichiometrically to completely esterify the fumaric acid and to provide in addition 1.35 pentaerythritol hydroxyl groups for each rosin acid carboxyl group. The fumaric acid amounted to 0.238 mol per mol of rosin acid.

There was present in the pentaerythritol .0077 equivalent of sodium or .0026 equivalent of sodium per mol of rosin acid. The calcium acetate added provided in addition 0.0110 equivalent of calcium per mol of rosin acid.

The method employed in esterifying the ingredients was substantially identical with that of Example 1. It was found that resins having acid values of from 27 to 58 were entirely compatible with ½ sec. R. S. nitrocellulose at ester to nitrocellulose ratios of 1.5–1.0 to 4.0–1.0.

Example 7

| | Parts |
|---|---|
| N wood rosin | 1006 |
| Dipentaerythritol | 216.0 |
| Maleic anhydride | 40.0 |
| Calcium acetate·H₂O | 3.0 |

The rosin employed in this example was the same as in Example 1. The pentaerythritol used in this example was a pentaerythritol dimer containing 40.2% hydroxyl. The combining weight was 42.2. The amount of dipentaerythritol employed was accordingly sufficient to provide that required stoichiometrically to completely esterify the maleic anhydride and to provide in addition 1.44 pentaerythritol hydroxyl groups for each rosin acid carboxyl group. The maleic anhydride employed amounted to 0.136 mol per mol of rosin acid.

The method employed in esterifying the ingredients was substantially identical with that of Example 1. It was found that resins having acid values of from 23 to 47 were entirely compatible with ½ sec. R. S. nitrocellulose at ester to nitrocellulose ratios of 1.5–1.0 to 4.0–1.0.

Any rosin acid may be used in preparing the subject resinous esters. By the term "rosin acid material" there is meant not only the substantially pure rosin acids but also commercial wood and gum rosins from which the substantially pure rosin acids are obtainable. Commercial gum rosin also contains neutral bodies but usually in a somewhat lesser amount as compared with wood rosin. The term "rosin acid material" as used herein accordingly comprises substantially pure rosin acids and specific rosin acids obtainable therefrom as abietic, l-pimaric, d-pimaric, sapinic, etc. acids. The term also includes such substantially pure rosin acids, wood rosins or gum rosins which have been subjected to further treatment such as hydrogenation, dehydrogenation, disproportionation or heat-treatment. Of these various materials, wood or gum rosin is preferred since its use is economically advantageous and from the standpoint of producing a nitrocellulose compatible product is as effective as the others.

It has been previously stated that the pentaerythritol must be employed in an amount sufficient to provide the amount required stoichiometrically to completely esterify the alpha-beta unsaturated dicarboxylic acid and to provide in addition from 1.26 to 1.44 pentaerythritol hydroxyl groups for each rosin acid carboxyl group. If such an amount of pentaerythritol is employed that there is present substantially more than 1.44 pentaerythritol hydroxyl groups per rosin acid carboxyl group, the resulting resins tend to be soft and they and the lacquers prepared therefrom are deficient in water and alcohol resistance. On the other hand, if the amount of pentaerythritol employed corresponds to substantially less than 1.26 hydroxyl groups for each rosin acid carboxyl group, the acid value compatibility range is comparatively quite narrow and hence impractical. At the same time, the only nitrocellulose compatible resins obtainable under such a condition are high in acid value and have less practical utility. They are, moreover, difficult to produce commercially due to the higher esterification rates which obtain at the higher acid values.

Any alpha-beta unsaturated dicarboxylic acid such as maleic acid, fumaric acid, itaconic acid, citraconic acid, etc. may be employed in carrying out this invention. Similarly, the anhydrides of these acids may be employed and are to be regarded as true equivalents. Acids having 8 carbon atoms or less are preferred. Particularly preferred is maleic acid since it is available commercially and produces very desirable resins when used in accordance with this invention.

As mentioned previously, the proportions of alpha-beta unsaturated dicarboxylic acid to rosin acid are critical. If substantially more than 0.272 mol of dicarboxylic acid per mol of rosin acid is employed, gelation is generally encountered in preparing the resin. At 0.272 mol of dicarboxylic acid per mol of rosin acid, the acid value compatibility band is quite wide. For example, it can be seen from Figure 1, which represents the conditions which obtain for 0.238 mol of dicarboxylic acid per mol of rosin acid, that the acid value compatibility band is fairly wide and varies from the range of 33.5–52.5 at 1.26 pentaerythritol hydroxyl groups per rosin acid carboxyl group to the range of 18–52 at 1.44 pentaerythritol hydroxyl groups per rosin acid carboxyl group. As the proportion of the dicarboxylic acid to rosin acid is decreased, however, the band decreases in width, this showing that the dicarboxylic acid has the effect of broadening the acid value compatibility band. 0.136 mol of dicarboxylic acid per mol of rosin acid (the lower end of the critical range) represents the minimum amount of dicarboxylic acid which can be employed while at the same time achieving this broadening effect. In other words, in adding the dicarboxylic acid to a pentaerythritol-rosin acid system, 0.136 mol of the dicarboxylic acid per mol of rosin acid is the point at which the broadening effect becomes substantial. While satisfactory resins can be prepared using from 0.136 to 0.272 mol of dicarboxylic acid per mol of rosin acid, it is preferred to employ from 0.204 to 0.272 mol of the dicarboxylic acid per mol of rosin acid.

The compatibility catalysts employed in accordance with the invention have been well illustrated by the examples. In general, the preferred effective catalysts are compounds of metals of groups IA, IIA and IIB of the periodic table, which metals have atomic weights below 140. Thus, compounds of sodium, potassium, lithium, calcium, barium, strontium, magnesium, zinc and cadmium may be employed. As mentioned previously, lead and cobalt compounds may also be employed. It has been found that the metal compounds which are effective are those which in aqueous solution give an alkaline or basic reaction. Thus, the formates, acetates, carbonates, bicarbonates, oxides, hydroxides, etc. are all effective. The most effective, and hence the preferred, compounds are those most readily soluble in rosin acids, these being the formates and the acetates. Salts whose aqueous solutions are neutral or acid, for example calcium sulfate, have a deleterious effect on nitrocellulose compatibility. Highly acidic compounds are of no value since they decarboxylate the rosin acid.

In order to achieve a broadening of the acid value compatibility band or an extension of the acid value compatibility range, as the case may be, it is necessary to employ an effective amount of the catalyst. The minimum amount of catalyst required varies somewhat with the catalyst employed. However, in general it has been found that at least 0.0040 chemical equivalent of metal per mol of rosin acid is required to achieve this effect. Furthermore, about 0.400 chemical equivalent of metal per mol of rosin acid appears to be the point at which maximum broadening of the compatibility band is achieved. Although higher catalyst concentrations can be employed, there is no added advantage accruing. The preferred range of catalyst concentration is from 0.010 to 0.400 chemical equivalent of metal per mol of rosin acid. It will be understood that several metal compounds may be employed together as the catalyst, as in Example 1. In this case, the pentaerythritol used had a small amount of sodium as an impurity, and the sodium was present in an effective form for catalysis, although not per se in an effective amount.

The general methods of esterification used in applying the principles of this invention are those known to the art for esterifying pentaerythritol, an alpha-beta unsaturated dicarboxylic acid and a rosin acid material. Thus, an esterification temperature of at least 260° C. should be used. At the same time the temperature should not be permitted to go above the temperature of decomposition of the reactants or the reaction product. A temperature of from 270° C. to 290° C. is preferred. The order of adding the ingredients is not particularly critical. It is preferred, however, to heat the dicarboxylic acid and rosin acid material together first and to add the pentaerythritol and catalyst thereto at a temperature of from 190° C. to 230° C. If desired, all the ingredients may be heated together simultaneously.

During the esterification, a gentle stream of inert gas such as $CO_2$, $N_2$, etc. may be passed through the reaction mixture. Heating is discontinued at a point such that the product after cooling to room temperature has an acid value (using phenolphthalein indicator) in the acid value compatibility range which applies for the particular conditions at hand. This acid value will in every instance fall in the over-all range of 10 to 65 as explained previously. During the period of cooling of the ester from the esterification temperature to room temperature the acid value may drop by as much as 10 points and the extent of this drop in acid value is dependent upon the conditions under which the cooling is effected.

During the esterification reaction some of the reactants may be lost by distillation. Although these losses are generally slight, it is important to keep them at a very minimum. If the proportion of reactants originally employed is not maintained, it will be obvious that the acid value compatibility range which normally would apply will not obtain. To prevent such losses of ingredients or to keep such losses to a minimum, it is best not to sparge the resins during preparation. However, as illustrated by the examples, the use of a gentle stream of inert gas such as $N_2$, $CO_2$, etc. to agitate the ingredients may be advantageously employed. Losses of ingredients can also be minimized by maintaining considerable free space between the top of the reaction vessel and the surface of the reaction mixture or by employing a suitable condenser. In this manner, water of esterification can be removed while retaining substantially all the reactants.

Resinous esters prepared in accordance with this invention are truly compatible with nitrocellulose in the ester to nitrocellulose ratios of from 1.5–1.0 to 4.0–1.0. Lacquers comprising the ingredients in these proportions deposit films which are perfectly clear and do not exhibit seediness, graininess or haziness. Generally speaking, the lacquers themselves are also perfectly clear. In some cases, a slight cloudiness or haziness can be detected in the lacquer. Even in these cases, however, the resulting films evidence complete compatibility. Although in the examples the resins were tested for compatibility using ½ sec. R. S. nitrocellulose, the compatibility of the resins of this invention is not limited to compatibility with those particular types of nitrocellulose. The resins are compatible with the various types and grades of nitrocellulose used commercially in nitrocellulose lacquer formulations. The resins are also compatible with N-type ethyl cellulose.

The resinous esters prepared in accordance with this invention are unique in that they possess nitrocellulose compatibility. This property is basically new in the field of resinous esters prepared from a pentaerythritol, an alpha-beta unsaturated dicarboxylic acid and rosin. At the same time, these resins provide additional advantages when used in nitrocellulose lacquer formulations. The lacquer films deposited from such lacquers possess excellent cold check resistance and have excellent sanding properties. In both respects, these resins represent substantial improvements over the resins used heretofore in nitrocellulose lacquers, particularly the resins derived from glycerol, an alpha-beta unsaturated dicarboxylic acid and rosin.

Where in the specification and claims reference is made to pentaerythritol monomer content of a pentaerythritol, it will be understood that determination by the dibenzal method is meant. This method involves the following steps. Prepare a benzaldehyde-methanol reagent by adding 100 ml. of anhydrous methanol to 20 ml. of benzaldehyde. Add 5 ml. of water to a dry sample of the pentaerythritol (0.35–0.55 gram) contained in an Erlenmeyer flask. Heat the 5 ml. solution to boiling, add 15 ml. of the benzaldehyde-methanol reagent and mix these solutions well. Add 12 ml. concentrated HCl and shake the reaction mixture. Allow the reaction mixture to stand for 5 minutes with occasional swirling while the greater part of the precipitate of pentaerythritol dibenzal forms and then place the flask in an ice bath for 1 hour. Dilute the reaction mixture with 25 ml. of ice cold methanol-water solution (1:1 by volume) and filter through a weighed fritted glass crucible. Wash the precipitate free of benzaldehyde with 100 ml. of methanol-water solution (1:1 by volume) at a temperature of 20–25° C. Dry the precipitate to constant weight at 120° C. (about 2 hours). The pentaerythritol monomer is calculated using the following formula in which 0.0269 represents a correction value for the solubility of the pentaerythritol dibenzal:

$$\frac{(\text{Grams precipitate}+0.0269)\ 43.60}{\text{Grams Sample}} = \text{Per cent pentaerythritol monomer}$$

Where in the specification and claims reference is made to acid value, it will be understood that the phenolphthalein method for determining acid value is meant. This method involves the following steps. Dissolve about 3 grams of the resin in 15 ml. of toluene. Add 50 ml. of a neutral alcohol-benzene solution (1:1 by volume) and titrate the resulting solution with 0.5 N NaOH or KOH using phenolphthalein indicator to a permanent endpoint.

Where in the specification and claims reference is made to the hydroxyl value of a pentaerythritol, it will be understood that determination by the acetylation method is meant. This method involves the following steps. Prepare an acetic anhydride-pyridine solution by adding exactly 3.5 ml. water to 1000 ml. dry pyridine. After mixing, add 140 ml. acetic anhydride to make the reagent approximately 2.4 N. Weigh 0.5 to 0.6 gram of dry pentaerythritol into a 250 ml. Erlenmeyer flask. Add 25 ml. of the pyridine-acetic anhydride reagent from a constant delivery pipette. Attach the flask to a condenser and reflux gently for 30 minutes. Flush the condensers with 30–50 ml. of water, cool the flask for 20 min. in tap water to below 20° C. and titrate at once with 1.0 N NaOH using phenolphthalein indicator. Add the NaOH slowly (about 15–20 ml. per minute) until within 10 ml. of the endpoint and from then on add the NaOH dropwise. Determine the concentration of the pyridine-acetic anhydride reagent by making a blank determination on 25 ml. under the above conditions. The hydroxyl content is calculated using the following formula wherein A is the ml. NaOH used to titrate the blank, B is the ml. NaOH used to titrate the sample and N. F. is the normality factor of the NaOH:

$$\frac{1.7\ (A-B)\ N.\ F.}{\text{Grams sample}} = \text{Per cent hydroxyl}$$

All parts and percentages in the specification and claims are by weight unless otherwise mentioned.

What I claim and desire to protect by Letters Patent is:

1. The process for preparing a hard nitrocellulose compatible resin from a pentaerythritol, an alpha, beta-ethylenically unsaturated dicarboxylic acid and a rosin acid material which comprises reacting said ingredients under esterifying conditions in the presence of a compatibility catalyst until a resin having nitrocellulose compatibility and having an acid value of 10 to 65 is obtained, said compatibility catalyst being selected from compounds of metals having an atomic weight less than 140 of the class consisting of group IA, group IIA and group IIB of the periodic table, which compounds are alkaline-reacting in aqueous solution, said compatibility catalyst being employed in such an amount as to provide at least about 0.0040 chemical equivalent of metal per mol of rosin acid, said pentaerythritol being selected from the group consisting of pentaerythritol monomer, polypentaerythritols having hydroxyl values of at least 38% and pentaerythritol monomer-polypentaerythritol mixtures having hydroxyl values of at least 38%, said pentaerythritol being employed in an amount sufficient to provide the amount required stoichiometrically to completely esterify the dicarboxylic acid and to provide in addition from 1.26 to 1.44 pentaerythritol hydroxyl groups for each rosin acid carboxyl group, said alpha, beta-unsaturated dicarboxylic acid being employed in the amount of from 0.136 to 0.272 mol per mol of rosin acid, said α, β-unsaturated dicarboxylic acid containing no substituents other than carboxyl, said rosin acid material being selected from the group consisting of rosin acids, hydrogenated rosin acids, dehydrogenated rosin acids, disproportionated rosin acids, and heat-treated rosin acids.

2. The process of claim 1 wherein a compatibility catalyst is employed in such an amount as to provide from 0.0040 to 0.400 chemical equivalent of metal per mol of rosin acid.

3. The process of claim 1 wherein maleic acid is employed as the alpha, beta-unsaturated dicarboxylic acid.

4. The process of claim 1 wherein rosin is employed as the rosin acid material.

5. The process of claim 1 wherein the pentaerythritol is a pentaerythritol monomer-polypentaerythritol mixture containing from 70–90% pentaerythritol monomer and having an hydroxyl content of at least 42%.

6. The process of claim 5 wherein maleic acid is employed as the alpha, beta-unsaturated dicarboxylic acid.

7. The process of claim 6 wherein a compound of a metal of group IIA of the periodic table is employed as a compatibility catalyst.

8. The process of claim 7 wherein a compound of calcium is employed as a compatibility catalyst.

9. The process of claim 8 wherein calcium acetate is employed as a compatibility catalyst.

10. The process of claim 9 wherein rosin is employed and wherein the calcium acetate is employed in such an amount as to provide from 0.0040 to 0.400 chemical equivalent of metal per mol of rosin acid.

11. The process for preparing a hard nitrocellulose compatible resin from a pentaerythritol monomer-polypentaerythritol mixture containing from 70-90% pentaerythritol monomer and having an hydroxyl content of at least 42%, maleic acid and a rosin acid material which comprises reacting said ingredients under esterifying conditions in the presence of a compatibility catalyst until a resin having nitrocellulose compatibility and having an acid value from 10 to 65 is obtained, said compatibility catalyst being a zinc compound which is alkaline-reacting in aqueous solution, said compatibility catalyst being employed in such an amount as to provide at least about 0.0040 chemical equivalent of zinc per mol of rosin acid, said pentaerythritol monomer-polypentaerythritol mixture being employed in an amount sufficient to provide the amount required stoichiometrically to completely esterify the maleic acid and to provide in addition from 1.26 to 1.44 hydroxyl groups for each rosin acid carboxyl group, said maleic acid being employed in the amount of from 0.136 to 0.272 mol per mol of rosin acid, said rosin acid material being selected from the group consisting of rosin acids, hydrogenated rosin acids, dehydrogenated rosin acids, disproportionated rosin acids, and heat-treated rosin acids.

12. The process of claim 11 wherein zinc oxide is employed as a compatibility catalyst.

13. The process of claim 12 wherein rosin is employed as the rosin acid material and wherein zinc oxide is employed as the compatibility catalyst in such an amount as to provide from 0.0040 to 0.400 chemical equivalent of zinc per mol of rosin acid.

14. The process for preparing a hard nitrocellulose compatible resin from a polypentaerythritol having an hydroxyl value of at least 38%, an alpha, beta-unsaturated dicarboxylic acid and a rosin acid material which comprises reacting said ingredients under esterifying conditions in the presence of a compatibility catalyst until a resin having nitrocellulose compatibility and having an acid value from 10 to 65 is obtained, said compatibility catalyst being selected from compounds of metals having an atomic weight less than 140 of the class consisting of group IA, group IIA and group IIB of the periodic table, which compounds are alkaline-reacting in aqueous solution, said compatibility catalyst being employed in such an amount as to provide at least about 0.0040 chemical equivalent of metal per mol of rosin acid, said polypentaerythritol being employed in an amount sufficient to provide the amount required stoichiometrically to completely esterify the dicarboxylic acid and to provide in addition from 1.26 to 1.44 hydroxyl groups for each rosin acid carboxyl group, said alpha, beta-unsaturated dicarboxylic acid being employed in the amount of from 0.136 to 0.272 mol per mol of rosin acid, said α,β-unsaturated dicarboxylic acid containing no substituents other than carboxyl, said rosin acid material being selected from the group consisting of rosin acids, hydrogenated rosin acids, dehydrogenated rosin acids, disproportionated rosin acids, and heat-treated rosin acids.

15. The process of claim 14 wherein the polypentaerythritol is dipentaerythritol.

16. The process of claim 15 wherein maleic acid is employed as the alpha, beta-unsaturated dicarboxylic acid and wherein a compound of a metal of group IIA of the periodic table is employed as a compatibility catalyst.

17. The process of claim 16 wherein a compound of calcium is employed as a compatibility catalyst.

18. The process of claim 17 wherein calcium acetate is employed as a compatibility catalyst.

19. The process of claim 18 wherein rosin is employed as the rosin acid material and wherein calcium acetate is employed as a compatibility catalyst in such an amount as to provide from 0.0040 to 0.400 chemical equivalent of metal per mol of rosin acid.

ALFRED E. RHEINECK.

REFERENCES CITED

The following references are of record in the file of this patent:

UNITED STATES PATENTS

| Number | Name | Date |
|---|---|---|
| 1,722,566 | Ellis | July 30, 1929 |
| 1,739,446 | Durr | Dec. 10, 1929 |
| 1,783,165 | Bruson | Nov. 25, 1930 |
| 1,993,028 | Peterson | Mar. 5, 1935 |
| 2,251,070 | Schantz | July 29, 1941 |
| 2,322,197 | Oswald | June 15, 1943 |
| 2,399,692 | Peterson | May 7, 1946 |

FOREIGN PATENTS

| Number | Country | Date |
|---|---|---|
| 854,351 | France | Jan. 15, 1940 |